United States Patent
Petts et al.

(10) Patent No.: US 9,769,008 B1
(45) Date of Patent: Sep. 19, 2017

(54) ANNOTATIONS FOR CONTENT CREATION FEEDBACK

(75) Inventors: James C. Petts, Redmond, WA (US); Aaron James Dykstra, Federal Way, WA (US); Lindsey Christina Fowler, Seattle, WA (US); Laura Ellen Grit, Seattle, WA (US); Dennis Harding, Bothell, WA (US); George Ionkov, Seattle, WA (US); Samuel A. Minter, Bellevue, WA (US); Yong Xi, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 1817 days.

(21) Appl. No.: 12/960,088

(22) Filed: Dec. 3, 2010

(51) Int. Cl.
G06F 15/16 (2006.01)
H04L 29/08 (2006.01)

(52) U.S. Cl.
CPC ............... *H04L 29/08072* (2013.01)

(58) Field of Classification Search
CPC ............... G06Q 10/10; G06F 17/241
USPC ....................................... 709/224
See application file for complete search history.

(56) References Cited

U.S. PATENT DOCUMENTS

| | | | |
|---|---|---|---|
| 5,146,552 A * | 9/1992 | Cassorla et al. | 715/234 |
| 2003/0081000 A1 * | 5/2003 | Watanabe et al. | 345/751 |
| 2005/0132281 A1 * | 6/2005 | Pan et al. | 715/515 |
| 2006/0161578 A1 * | 7/2006 | Siegel et al. | 707/102 |
| 2007/0055926 A1 * | 3/2007 | Christiansen et al. | 715/512 |
| 2008/0222552 A1 | 9/2008 | Batarseh et al. | |
| 2009/0037259 A1 * | 2/2009 | Blenk | 705/10 |
| 2009/0052778 A1 * | 2/2009 | Edgecomb et al. | 382/188 |
| 2009/0204882 A1 * | 8/2009 | Hollander et al. | 715/230 |
| 2010/0131856 A1 | 5/2010 | Kalbfleisch et al. | |
| 2011/0087955 A1 | 4/2011 | Ho et al. | |
| 2011/0184960 A1 * | 7/2011 | Delpha et al. | 707/754 |
| 2012/0036423 A1 * | 2/2012 | Haynes et al. | 715/230 |

OTHER PUBLICATIONS

Office action for U.S. Appl. No. 12/960,137, mailed on Apr. 12, 2013, Belle et al, "Localized Feedback for Content Creation", 9 pages.
U.S. Appl. No. 12/960,137, filed Dec. 3, 2010, Belle et. al., 'Localized Feedback for Contet Creation'.
Cohen, "Blurring the Lines Between Apps and Books", retrieved on Oct. 15, 2010 at <<http://www.nytimes.com/2010/10/25/business/media/25link.html?_r=3&nl=technology&emc=techupdateema3&pagewanted=print>>, The New York Times, Oct. 24, 2010, 0, 3 pages.

* cited by examiner

Primary Examiner — Vivek Srivastava
Assistant Examiner — Muhammad Raza
(74) Attorney, Agent, or Firm — Lee & Hayes, PLLC

(57) ABSTRACT

Content is distributed electronically to a plurality of users. As the users consume the content, they may annotate the content to indicate corrections, comments, or other information. Annotations are collected at a server and reported back to content creators, such as authors, publishers, translators, editors, etc.

20 Claims, 7 Drawing Sheets

ANNOTATIONS FOR CONTENT CREATION FEEDBACK

BACKGROUND

For many years, information and ideas have been primarily distributed using print media such as books and periodicals. Printed publication of content has been associated with a formal and well-defined process that includes authoring, editing, proofing, and other preliminary steps of revision and refinement intended to reduce any chances for error in the permanent, published copies of the content.

With the widespread use of the Internet and other communications technologies, however, it has become possible to distribute large, coherent units of media, such as books and periodicals, using electronic technologies. Although the information in such media is often intended to be relatively static, in many cases it is quite easy to revise electronically distributed content. In some cases, content can even be revised after its distribution, by automatically providing updates to electronic devices upon which the content is consumed.

Although the nature and capabilities of content distribution are changing, the electronic publication process often continues to follow the same procedures that were used in the publication of printed media.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items.

DETAILED DESCRIPTION

Overview

This disclosure describes annotating digital works for providing feedback to authors and other creators of the digital works. Digital works such as electronic books (eBooks) are distributed to consumers for rendering on eBook reader devices or other suitable reader displays. Users may create annotations within the digital works, which are subsequently reported to an annotation service or server. The annotation service compiles annotations and organizes them for presentation in an easily digestible format, and then provides the compiled annotations to the creators, editors, publishers, or other users associated with the respective digital works. Annotations may consist of various things, ranging from typographical corrections to general comments.

Example Environment

Figure 1:
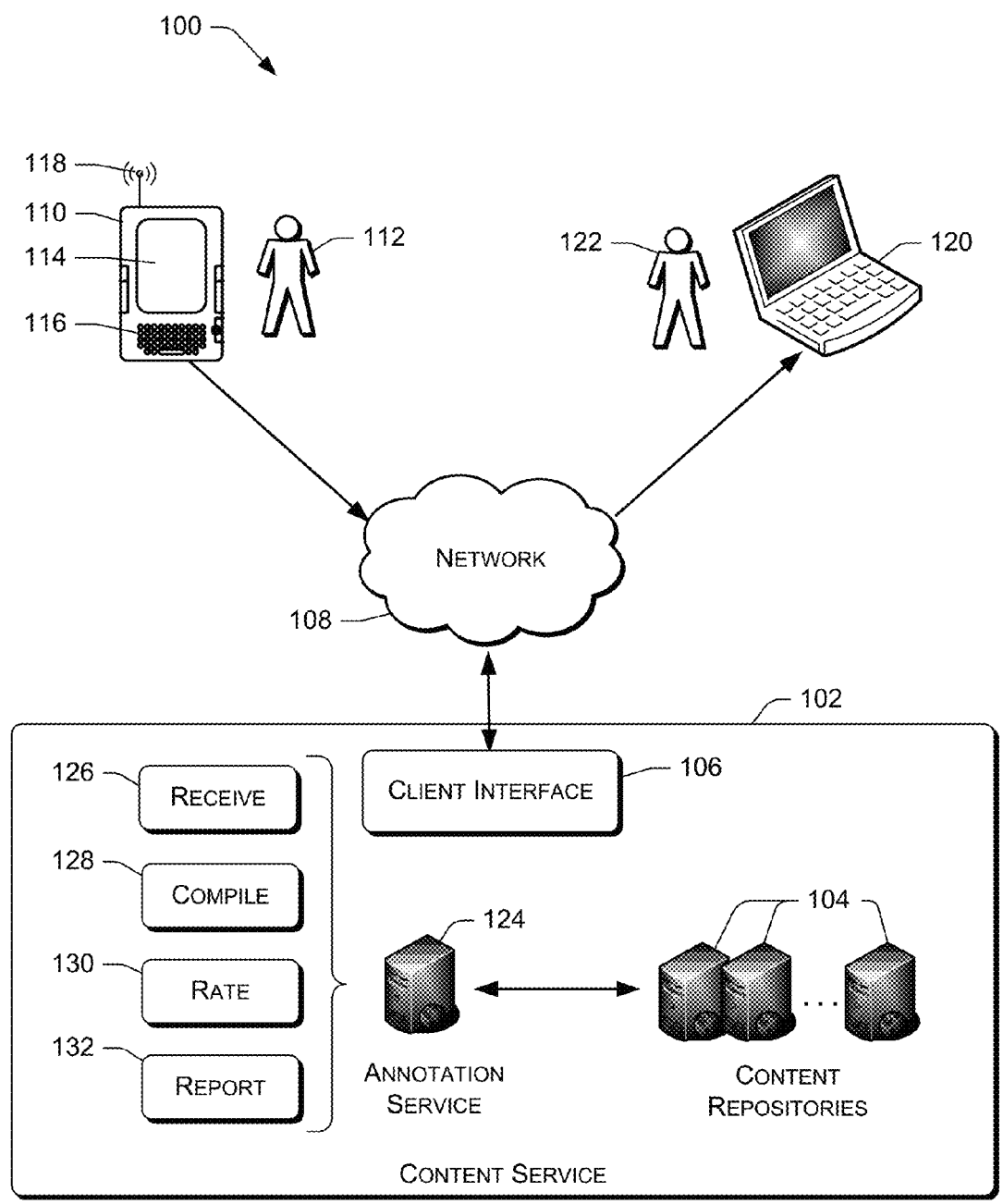
FIG. 1 is an illustrative architecture for distributing electronic content and reporting annotations to the electronic content.

FIG. 1 shows an illustrative environment 100 configured to distribute electronic books (eBooks) and other digital or electronic content to human readers or consumers, also referred to herein as users. For discussion purposes, the architecture and techniques are described in an online context where content items are retrieved from an online service. However, the concepts described herein are also applicable in other architectures, such as offline environments.

The environment 100 has an online content service 102 from which content items can be purchased or otherwise obtained. The content service 102 includes content repositories or servers 104 that store content items such as eBooks. The terms "electronic document", "electronic book", and/or "eBook", as used herein, include electronic or digital representations of printed works, as well as digital content that may include text, multimedia, hypertext, and/or hypermedia. Examples of printed and/or digital works include, but are not limited to, books, magazines, newspapers, scholarly works and papers, journals, reference materials, telephone books, textbooks, anthologies, instruction manuals, proceedings of meetings, forms, directories, maps, web pages, etc. Accordingly, the terms electronic document, electronic book, and eBook may include any content that is in electronic or digital format.

The content service 102 might be implemented in some embodiments by an online merchant or vendor. Electronic books and other electronic content might be offered for sale by such an online merchant, or might be available to members or subscribers for some type of periodic or one-time fee. In some circumstances, eBooks or other content might be made available without charge.

The content service 102 may have a virtual storefront or other type of online client interface 106 for interaction with consumers and/or devices. The client interface 106 may expose a graphical, web-based user interface that can be accessed by human users to browse and obtain (e.g., purchase, rent, lease, etc.) content items such as eBooks and audio books. The client interface 106 may also expose programmatic interfaces that devices can use to obtain digital content items and to otherwise communicate with components of the content service 102. In the illustrated embodiment, the client interface 106 allows devices to obtain content items from the content repositories 104, and also allows devices to return annotations and other information to the content service 102.

The content service 102 may have wide-area network connectivity, allowing communication between the content service 102 and remote content consumption devices or readers. In the example of FIG. 1, the content service 102 communicates through a public network 108 such as the Internet. Other networks might be used, such as private networks, cellular networks, and other types of networks with wide geographical coverage. In practice, a combination of different types of networks and network technologies are often involved in communications between the content service 102 and remote consumption devices.

As an example, FIG. 1 shows a content consumption device 110, along with a user 112 of the content consumption device 110. The content consumption device 110 can be an eBook reader device dedicated to and specifically configured for rendering eBooks. Alternatively, the content consumption device 110 can comprise some other type of electronic device, such as a cellular phone, a personal digital assistant, a personal music player, a tablet computer, a laptop computer, etc.

In this example, the content consumption device 110 is a handheld, portable device having a flat-panel display 114 upon which eBooks or other content can be displayed. The display 114 may be implemented with touch-sensitive technology that is responsive to user input registered via, for example, a finger, a stylus, or other similar pointing device. The eBook reader device 110 may also include a keyboard 116 or other types of actuatable elements that may have dedicated or assignable operations. For instance, the device 110 may have a power on/off button, selection keys, joystick, touchpad, and so forth.

The touch-screen display 114 presents content items such as eBooks in a human-readable format to the user 112. The touch-screen display 114 may depict, for example, text of the eBooks, along with illustrations, tables, or graphic elements that might be contained in the eBooks. In some cases, the eBooks may include multimedia components, such as video or audio. In such scenarios, the display 114 (or an additional display) may also be configured to present video, and the device 110 may be equipped with audio output components to play audio files.

In the particular embodiment illustrated by FIG. 1, the content consumption device 110 has a wireless communications receiver or transceiver 118, represented in FIG. 1 by an antenna symbol. The wireless communications receiver or transceiver 118 is configured to communicate wirelessly through the network 108 with the client interface 106 of the content service 102. The wireless communications receiver or transceiver 118 can be a wireless local-area or wide-area network receiver, transceiver, or port, configured to communicate through a local-area or wide-area network using conventional IP (Internet Protocol) and IP-related protocols for wireless network communications. Alternatively, the wireless communications receiver or transceiver 118 might be a cellular-based communications component or device such as used in mobile telephones or other personal communications devices. Various different types of technologies might alternatively be used for communications with the content service 102. The communications capabilities of the content consumption device 110 can be used to interact with the content service 102, for example to download content from the content service 102. The communications capabilities may also be used to submit information to the content service 102 as will be described below.

FIG. 1 also shows a report terminal 120 that can be used by a content creator 122 to receive and view annotations made by users. The term "content creator" is used herein to reference a person or entity that has played some role in creating or providing an eBook or other electronically-distributed content item. Creators of different content items might include authors, editors, translators, illustrators, artists, distributors, providers, retailers, publishers, agents, and so forth.

The report terminal 120 represents any number of different types of devices that might be used to receive and render reports or other information to various creators of content items. In many cases, the report terminal 120 might comprise a personal computer or similar device having an Internet browser to receive reports via public network 108.

Although only a single content consumption device and a single report terminal are shown in FIG. 1, it should be understood that these represent a plurality of such devices. Generally, multiple users 112 will consume multiple content items on multiple respective content consumption devices 110, and multiple creators will receive multiple annotation reports on multiple report terminals 120. Accordingly, the content consumption device 110, the user 112, the report terminal 120, and the content creator 120 will be referred to herein as either singular or plural, depending on the context.

Furthermore, content items and annotation reports as described herein may be used with various different types of devices other than the devices shown. For example, the functionality of the content consumption device 110 might in many cases be implemented by programs or applications running on general-purpose computing devices such as personal computers, tablet computers, personal digital assistants, smartphones, or other computer-like devices, many of which are capable of installing and executing applications or programs designated or provided by their users. More specifically, the content consumption and annotation functionality described herein might be provided by specialized software running on a computer or computing device that is not dedicated to or specially configured for rendering and consuming eBooks.

In the illustrated example, the content consumption device 110 is configured to accept localized annotations from the user 112. An annotation can take many different forms, including general comments, in-line corrections, and so forth. Localized annotations may include at least the following:

- editorial revisions;
- typographical corrections;
- translations;
- language translation corrections;
- facts;
- factual corrections;
- thematic suggestions;
- criticisms;
- answers to questions posed by at least one of the one or more creators or other users;
- supplemental or additional content; and
- storyline votes.

Localized annotations are generally associated with a specific portion or sub-portion of the content item, such as a word, sentence, or paragraph. For example, a user might select a particular word, phrase, or sentence from a content item and provide a comment regarding that word, phrase, or sentence.

Some annotations, such as corrections and revisions, may be made by directly editing the text of a content item, in a format known as "redlining" in which individual additions and deletions are explicitly identified. Corrections and revisions may also be made using editing symbols or abbreviations, or by inserting comments describing the nature of the desired correction or revision. More general annotations, such as suggestions, criticisms, answers to questions from content creators, and descriptions of supplemental or additional content may be made via textual comments associated with or inserted in particular locations within content items. Some types of annotations, such as storyline votes (where users vote on different plot options) and answers to other types of multiple choice or true/false questions, may be in response to specific prompts and specialized user interface controls that allow a user to simple select a desired vote or answer.

The content service 102 has an annotation service 124 that receives annotations from multiple users or consumers of content items. The annotation service 124 compiles the annotations and creates annotation reports for creators of content items. The annotation reports are made available at the client interface 106, and retrieved by the report terminals 120 for viewing by the content creators 122. Each annotation report shows annotations for a particular content item, and is viewable by one or more content creators 122 of that content item. The annotation reports can be organized, formatted, and summarized in ways that are easily understood by the content creators 122.

General functions performed by the annotation service 124 are indicated by blocks 126, 128, 130, and 132, corresponding to acts or actions performed by the annotation service 124 in certain embodiments.

One function performed by the annotation service 124, indicated at 126, comprises receiving annotations from a plurality of users 112. The content consumption devices 110 are configured, either by dedicated functionality or by installed applications, to render content items and to allow users to annotate those content items. The annotations are then submitted to the annotation service 124 using the client interface 106 of the content service 102. Each annotation is associated with information indicating the location or portion within a content item to which the annotation pertains. The location may be identified as an absolute position, a word, a phrase, a paragraph, a page, a chapter, and so forth. More specifically, locations within content items may be specified using some type of invariant referencing. This allows specification of a location within a digital work in a manner that does not vary with screen size, font type, font size, or other variations in display conditions of the digital work. For example, absolute location might be specified by character count from the beginning of a textual item.

In the illustrated embodiment, the annotation service 124 is also configured at 128 to compile annotations from different users. The annotation service 124 receives and stores the annotations in a local database in which the annotations are indexed by content item and by portion or location of content item. For example, a particular annotation is identified as pertaining to a particular content item and to a particular location within that content item.

The compiling 128 may also comprise combining similar or identical annotations. For example, if a specific grammatical correction is made multiple times, the annotation service 124 may simply record the correction and the number of times it was made. Duplicate elimination such as this may be performed when receiving annotations, or in preparation for reporting annotations to the content creators 122.

The annotation service 124 can optionally be configured to rate individual annotations at 130, based on the credibility, reputation, expertise, etc. of the users 112 who submitted the annotations. Ratings may be based on various information known about users or upon reactions to previous annotations made by those users. For example, content creators 122 may provide ratings regarding specific annotations, which might in turn be used to rate further annotations from the same users 112. Other users might also provide ratings of certain annotations. Similarly, the annotation service 124 might keep track of annotations, such as typographical or grammatical corrections, that were either accepted or rejected by content creators 122. It might then be assumed that those users 112 whose annotations have historically been accepted at a high rate are relatively reliable annotators, while those users 112 whose annotations have historically been accepted less frequently are relatively less reliable. In another implementation, users who submit annotations that are similar to those of a large number of other users may be deemed credible, while users whose annotations are relatively unique may be considered less credible. Specific criteria for rating annotations and contributors will of course vary depending on circumstances and design objectives.

Annotations may also be rated based on known expertise, qualifications, or previous experience of the annotating users 112. For example, annotations regarding a medical work may be rated more highly if the contributing user 112 is known to have medical qualifications. Similarly, grammatical corrections may be rated more highly if the contributor is a professional editor or has other writing-related qualifications.

In the illustrated embodiment, the annotation service 124 is also configured to report collected annotations to the content creators 122. Reports may be provided through the client interface 106 of the content service 102, and retrieved by the report terminal 120 upon demand. For example, one of the content creators 122 might use an Internet browser to open a web site provided by content service 102 to display a report. Other delivery mechanisms are also possible, such as by embedding reports in emails that are sent periodically to one or more of the content creators 122.

The described annotation functionality can be used for various purposes, from gathering general user feedback to proof-reading. In some cases, a content creator may release and distribute an early version of a content item to a limited audience, and then collect annotations from that audience. The annotations might identify errors in the content item such as typographical errors, grammatical errors, factual errors, and so forth. Annotations may simply point out the errors, or may also propose corrections. Furthermore, collected annotations might offer more general suggestions or directives, such as thematic suggestions. Annotations may also be used to provide additional or supplemental information and materials, such as additional facts, background information, photographs, references to related works or information, and so forth.

Although gathering annotations in this manner may be particularly useful in conjunction with early versions of a work, it may also be useful to gather annotations in conjunction with more mature works. It may be useful through such user annotations to learn more information about the subject matter of a content item and even to obtain additional materials and references that might be included in future editions of the content item. Permitting users to submit feedback in this manner may also increase the loyalty of such users to the content creators.

Although FIG. 1 illustrates distribution of annotation reports to content creators, annotations may in some cases be made available to other users 112, either by way of annotation reports or by showing annotations of other users within the original content itself. Users may be given the ability to specify their annotations as being either private or public. Private annotations will be distributed only to content creators 122, while public annotations may be visible to other users 112 of the same content.

Annotations may be treated as anonymous, so that the contributors of the annotations are not identified either to the content creators 122 or to any other persons to whom the annotations might be available. In some embodiments, any personally identifying information may be removed before or upon submission. In other embodiments, users may be given the ability to designate their annotations as being either anonymous or non-anonymous, and the annotations may be treated in accordance with the users' designations.

In some cases, annotation reports may be distributed more widely, in a web-based format such as a blog or discussion forum. Users may be able to respond to or comment on annotations in a threaded format, in which a discussion relating to a specific part of a content item or relating to a specific annotation may be grouped into a coherent and linked discussion. A forum such as this may be restricted in some cases to selected people, such as to people who have purchased the subject content item, to members of a club or organization, or to users who meet some other criteria.

User Interface Examples

Figure 2:
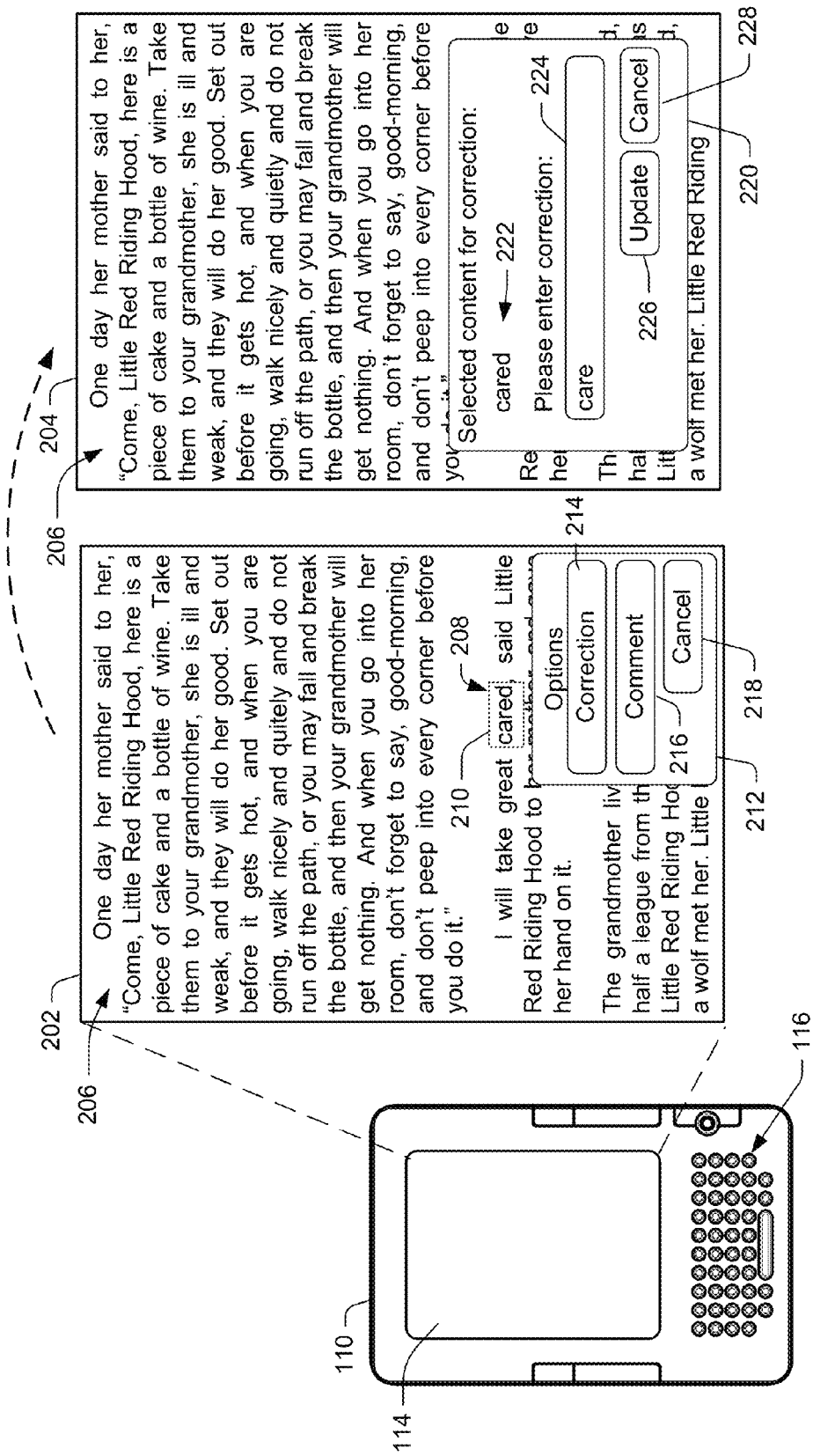
FIGS. 2 and 3 show user interface examples in which a user may annotate electronic content.

FIG. 2 shows an illustrative user interface that enables a user to provide annotations in the form of corrections to the text of a content item. FIG. 2 shows the content consumption device 110 and two sequential screen examples, 202 and 204, that can be displayed by the content consumption device 110. In this example, the user has selected the word "cared", indicated by reference numeral 208, by touching or double-tapping it. Various mechanisms can be used in different embodiments for selecting a word or other portions of the displayed text, and might include touch-screen gestures or cursor manipulation in conjunction with buttons or other input devices. In some embodiments, the user may place a cursor at the beginning of the content that the user desires to select, and then select the desired content by activating a button or other device control to move the cursor to the end of the desired selection. A currently selected word or portion may be indicated by highlighting, such as by a rectangular selection indicator 210 that surrounds the selected text. Highlighting may alternatively be in the form of underlining, color change, blinking text, and/or the like.

Once the user has selected the desired content (in this case the word "cared"), the content consumption device 110 may present an option menu 212 for the user to select in order to annotate the selected content. In this example, the option menu 212 includes a correction option 214 and a comment option 216. In addition, the option menu 212 may include a cancel option 218, which may be selected to cancel the annotation operation and to remove the option menu 212 without taking any further actions. The different options can be selected or activated by touching, by moving a cursor and clicking, or by other means.

The correction option 214 can be selected to provide a correction to the selected text 208 of content item 206. In response to a user selecting the correction option 214, the content consumption device displays a correction menu or pane 220. The correction pane 220 may include a display portion 222 that displays the selected content. For example, the display portion 222 may display the word "cared". The content modification menu 220 may further include an input portion 224 in which the user may type a modification to the selected content. For example, the user may type the word "care" in the input portion 224.

The correction pane 220 may further include an update option 226 and a cancel option 228. The cancel option 228 may be selected by the user to dismiss the content modification menu 220 without taking any further action and without implementing any changes to the text of content item 206. Selecting update option 226 causes the content consumption device 110 to record the proposed modification or correction. Subsequently, the correction may or may not be displayed in conjunction with the original text. In some embodiments, the correction may actually be implemented in the local version of the content item 206. In other embodiments, corrections may be treated as proposals, and may be indicated by redlining or by some other means. In some embodiments the presence of annotations, including corrections, may be indicated by a small icon near the annotated text. Such annotations might be viewable as pop-up panes when a user selects the corresponding icons.

Selecting the update option 226 may also cause the content consumption device 110 to submit the correction to annotation service 124 via network 108. Corrections and other annotations may be submitted from consumption devices immediately, at periodic intervals, or at available opportunities such as when communication components are active. In addition, the user may be prompted for permission before submitting annotations.

Figure 3:
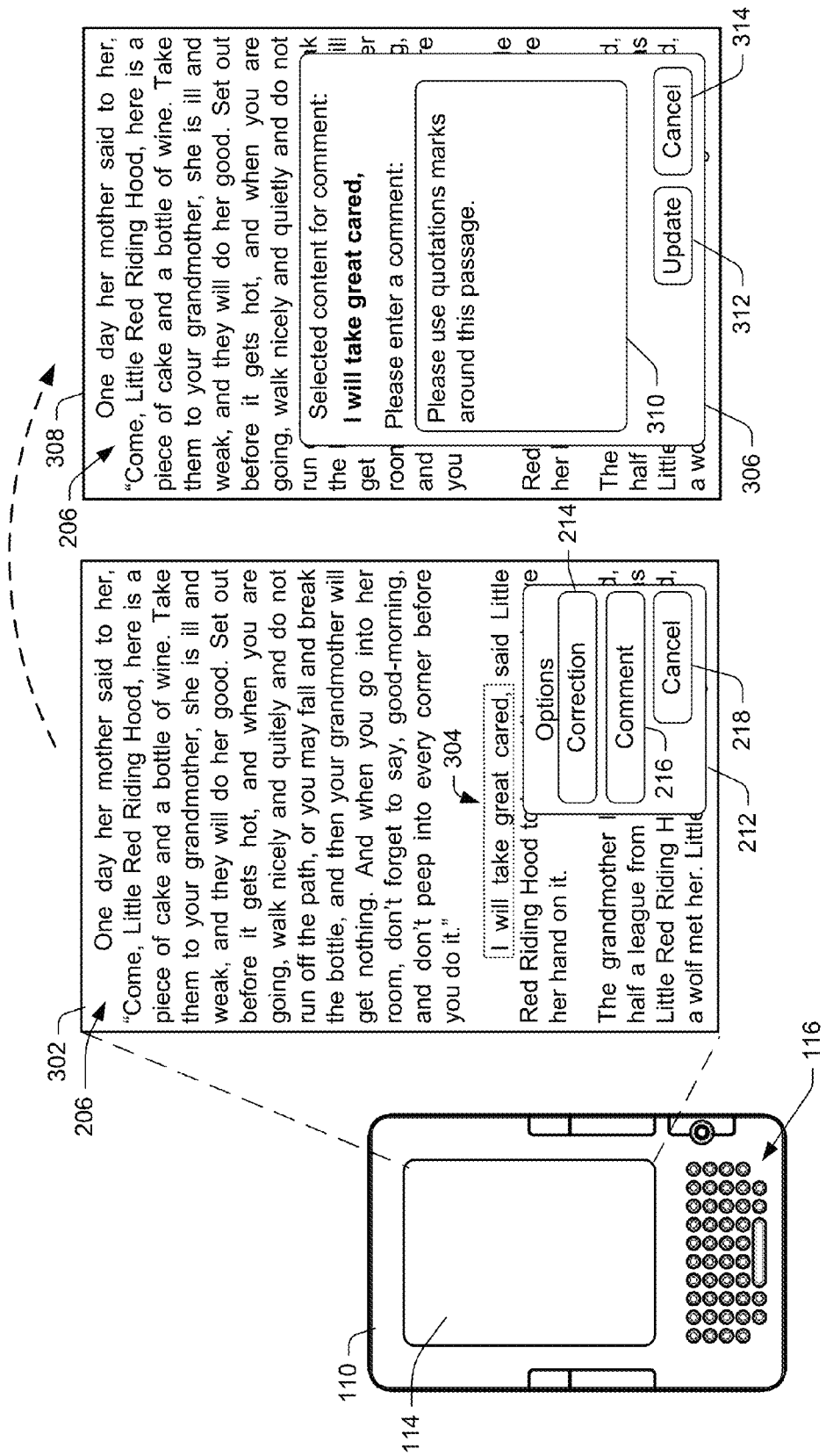

FIG. 3 shows an illustrative user interface that enables a user to provide a comment regarding a selected location or portion of the displayed content item 206. A first screen 302 shows the option menu 212, which has been displayed after the user has selected a phrase 304 of the content item 206 ("I will take great cared,"). In this example, it is assumed that the user selects the comment option 216 from the option menu 212, which causes the content consumption device 110 to display a comment entry menu or pane 306 in a second screen 308. The comment entry pane 306 has a text input area 310 into which a user can enter comments or other text, to be associated with the previously selected text 304 from the content item 206. The comment entry pane 306 has an update option 312 that can be selected to save and submit the entered comment, and a cancel option 314 that can be selected to dismiss the comment entry pane with no further action.

Figure 4:
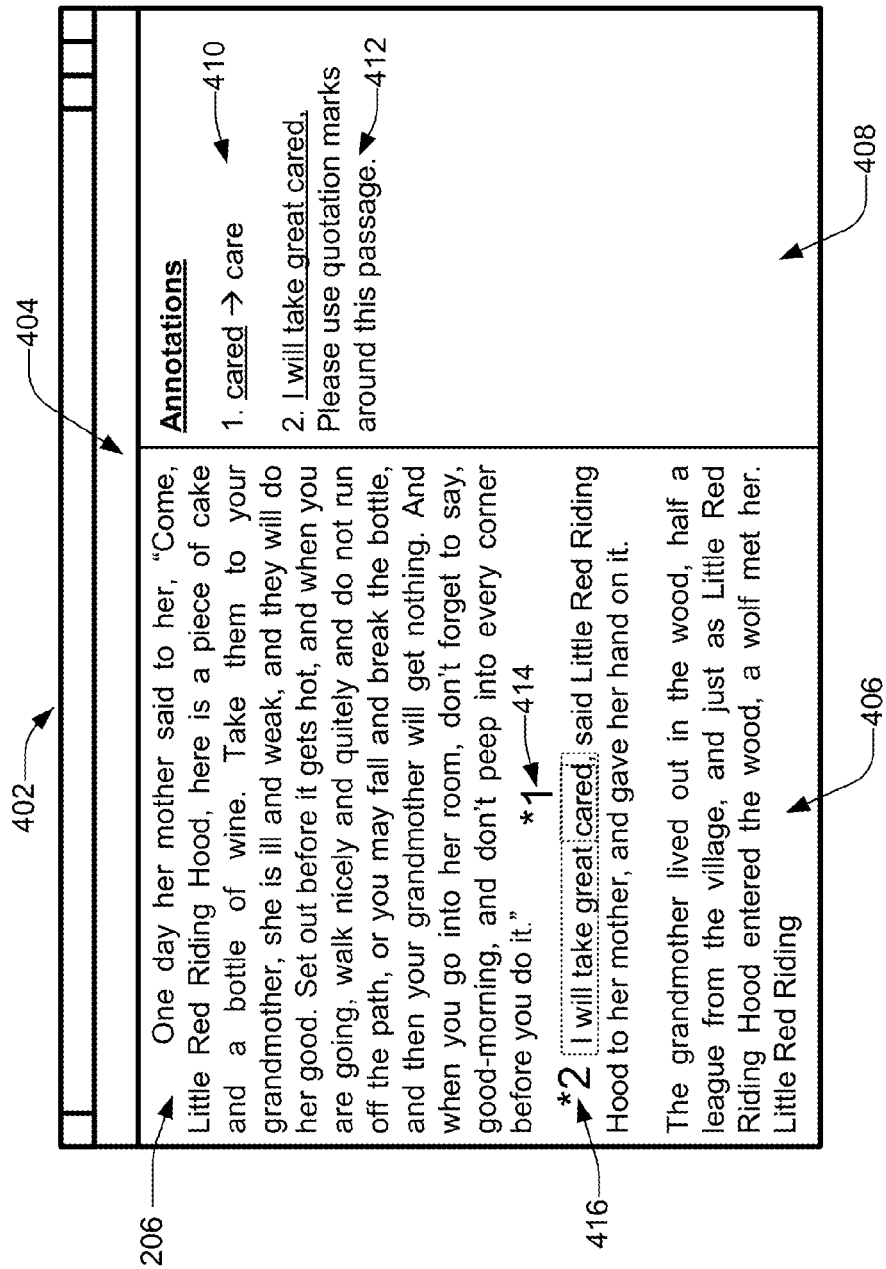
FIG. 4 shows a user interface example in which annotations are reported to a content creator.

FIG. 4 shows an example of how annotation reports might be compiled and shown to one or more of creators 122. In this example, a browser application 402 has been used to open a web site containing an annotation report 404. The annotation report 404 in this example has two panes: a content pane 406 and an annotation pane 408. The content pane 406 shows text or other graphics of a content item for which annotations have been received. This example shows the text that was the subject of annotations in the examples of FIGS. 2 and 3.

The annotation pane 408 shows received annotations to portions of the content shown in content pane 406. This example includes a first annotation 410 resulting from the example of FIG. 2, and a second annotation 412, resulting from the example of FIG. 3. The annotations are presented in a numbered list. In the content pane 406, numeric indicators 414 and 416 are displayed over or adjacent to the text strings that are the subject of annotations, indicating which of the numbered annotations corresponds to each text string. In this example, the first or "1" annotation corresponds to the word "cared" of the content item 206. The second or "2" annotation corresponds to the phrase or text string "I will take great cared,". Note that is a simple example of visually indexing annotations of annotation pane 408 to their corresponding locations within the content pane 406, and that such indexing can be performed in many different ways.

The first annotation 410 is a correction or direct edit, in which a selected string of text is changed to a different string of text. Specifically, the word "cared" is changed to the word "care". The first annotation 410 is numbered with the numeral "1", corresponding to the numeric indicator 414, which is positioned adjacent the word "cared" that is the subject of the annotation.

The second annotation 412 is a comment or instruction. The second annotation 412 is numbered with the numeral "2", corresponding to the numeric indicator 416, which is positioned adjacent the phrase "I will take great cared," that is the subject of the annotation.

This is merely one example of how annotation reports might be presented to the content creators 122. In certain scenarios, a particular word, phrase, or paragraph might be the subject of a great number of annotations, which might be summarized in the annotation pane in response to selecting that word, phrase, or paragraph. In some embodiments, content locations that are the subject of annotations might be marked or highlighted in the content pane 406 with a non-obtrusive icon that can be selected by the content creator 122. Upon selection or other interaction with such an icon by the content creator 122, the annotations corresponding to that location can be displayed in the annotation pane.

Example Client and Server Configurations

Figure 5:
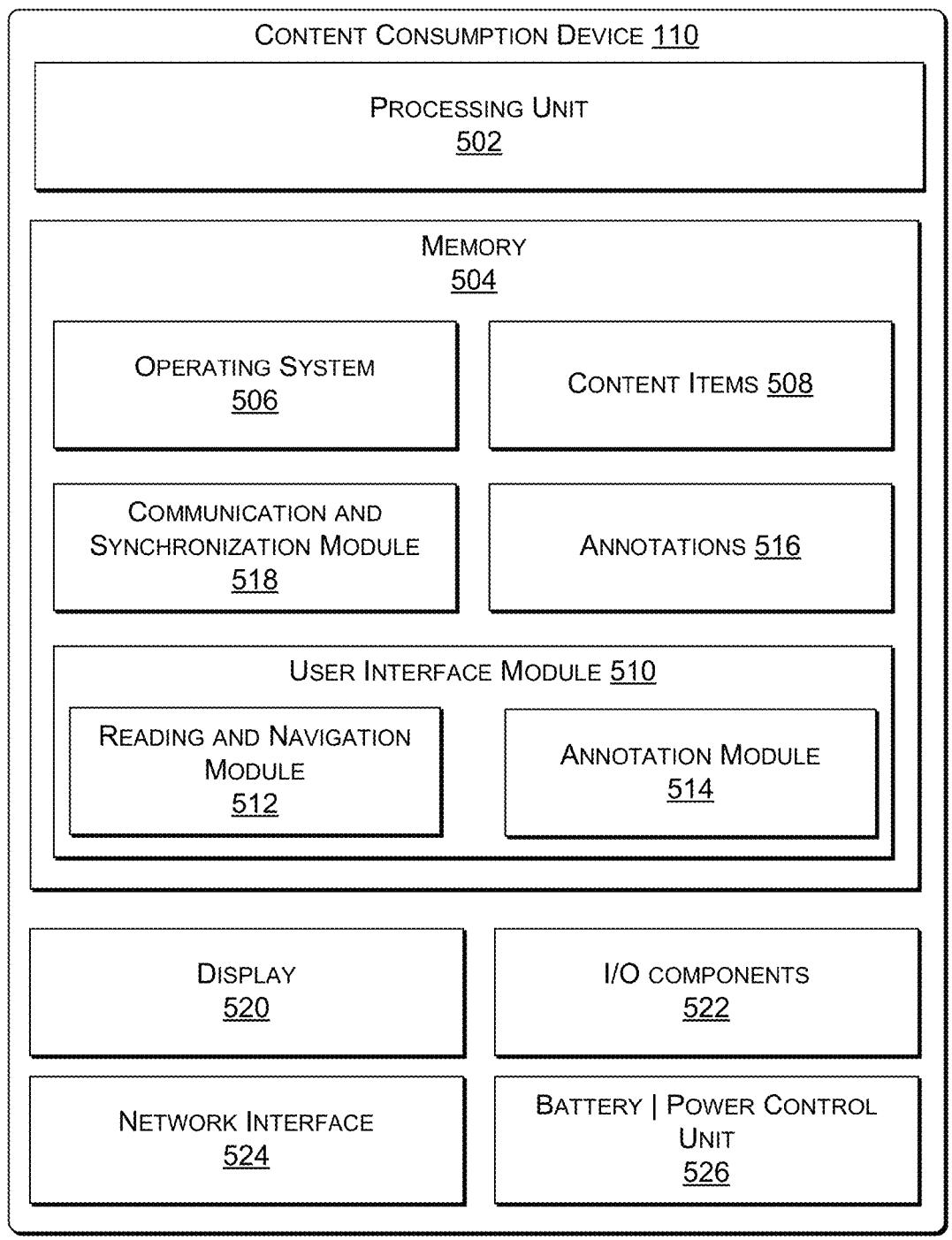
FIG. 5 is a block diagram illustrating selected modules of a content consumption device.

FIG. 5 illustrates relevant components that might be implemented in the content consumption device 110. In FIG. 5, it is assumed that the content consumption device 110 is a dedicated, handheld eBook reader device equipped with a display to display eBooks. Other embodiments, however, may employ any other type of content consumption device as discussed above.

In a very basic configuration, the content consumption device 110 includes a processing unit 502 composed of one or more processors, and memory 504. Depending on the configuration of the content consumption device 110, the memory 504 may comprise computer storage media and may include volatile and nonvolatile memory. Thus, the memory 504 may include, but is not limited to, RAM, ROM, EEPROM, flash memory, or other memory technology, or any other medium which can be used to store media items or applications and data which can be accessed by the content consumption device 110.

The memory 504 may be used to store any number of functional components and/or operational logic modules that are executable on the processing unit 502, as well as data and media items that are rendered by the content consumption device 110. Thus, the memory 504 may store an operating system 506 and an eBook storage database to store one or more content items 508, such as eBooks and audio books.

A user interface module 510 may also be provided in the memory 504 and executed on the processing unit 502 to provide for user operation of the content consumption device 110. The user interface module 510 in this example may include a reading and navigation module 512 that provides menus and other navigational tools to facilitate selection and rendering of the content items 508. This may include a browser or other application that facilitates access to sites over a network, such as websites or online merchants, or other sources of electronic content items or other products.

The user interface module 510 may also include an annotation module 514 the is configured as operating logic to perform many of the processes described herein. The annotation module 514 interacts with the user 112 and enables the user to make annotations within a content item that is being rendered by the content consumption device 110. The annotation module 514 may accept annotations from the user 112 and store them in the memory 504. Stored annotations are shown in FIG. 5 as annotations 516. Annotations 516 may have links or pointers to specific content items 5098 to which they pertain, and to specific locations within such content items.

A communication and synchronization module 518 is stored in the memory 504 and executed on the processing unit 502 to perform management functions in conjunction with the content repositories 104 (FIG. 1). Communication and synchronization module 518 communicates with the content service 102 to receive content items 508 and with the client interface 106 to report annotations made by individual users 112 on respective content consumption devices 110.

The content consumption device 110 may further include a display 520 upon which electronic books and other content items are rendered. In one implementation, the display uses electronic paper display technology. In general, an electronic paper display is one that has a high resolution (150 dpi or better) and is bi-stable, meaning that it is capable of holding text or other rendered images even when very little or no power is supplied to the display. The electronic paper display technology may also exhibit high contrast substantially equal to that of print on paper. Some exemplary electronic paper displays that may be used with the implementations described herein include bi-stable LCDs, MEMS, cholesteric, pigmented electrophoretic, and others. One exemplary electronic paper display that may be used is an E Ink-brand display. Touch sensitive technology may be overlaid or integrated with the electronic paper display technology to enable user input via contact or proximity to the screen.

The content consumption device 110 may further be equipped with various input/output (I/O) components 522. Such components may include various user interface controls (e.g., buttons, joystick, keyboard, etc.), audio speaker, connection ports, and so forth.

A network interface 524 may support both wired and wireless connection to various networks, such as cellular networks, radio, WiFi networks, short range networks (e.g., Bluetooth), IR, and so forth. The network interface 524 facilitates receiving electronic books and other content as discussed herein. Of particular note, the network interface 524 enables wireless delivery of the content items 508 over a wireless network.

The content consumption device 110 may also include a battery and power control unit 526. The power control unit operatively controls an amount of power, or electrical energy, consumed by the content consumption device 110. Actively controlling the amount of power consumed by the device may achieve more efficient use of electrical energy stored by the battery.

The content consumption device 110 may have additional features or functionality. For example, the content consumption device 110 may also include additional data storage devices (removable and/or non-removable) such as, for example, magnetic disks, optical disks, or tape. The additional data storage media may include volatile and nonvolatile, removable and non-removable media implemented in any method or technology for storage of information, such as computer readable instructions, data structures, program modules, or other data.

Figure 6:
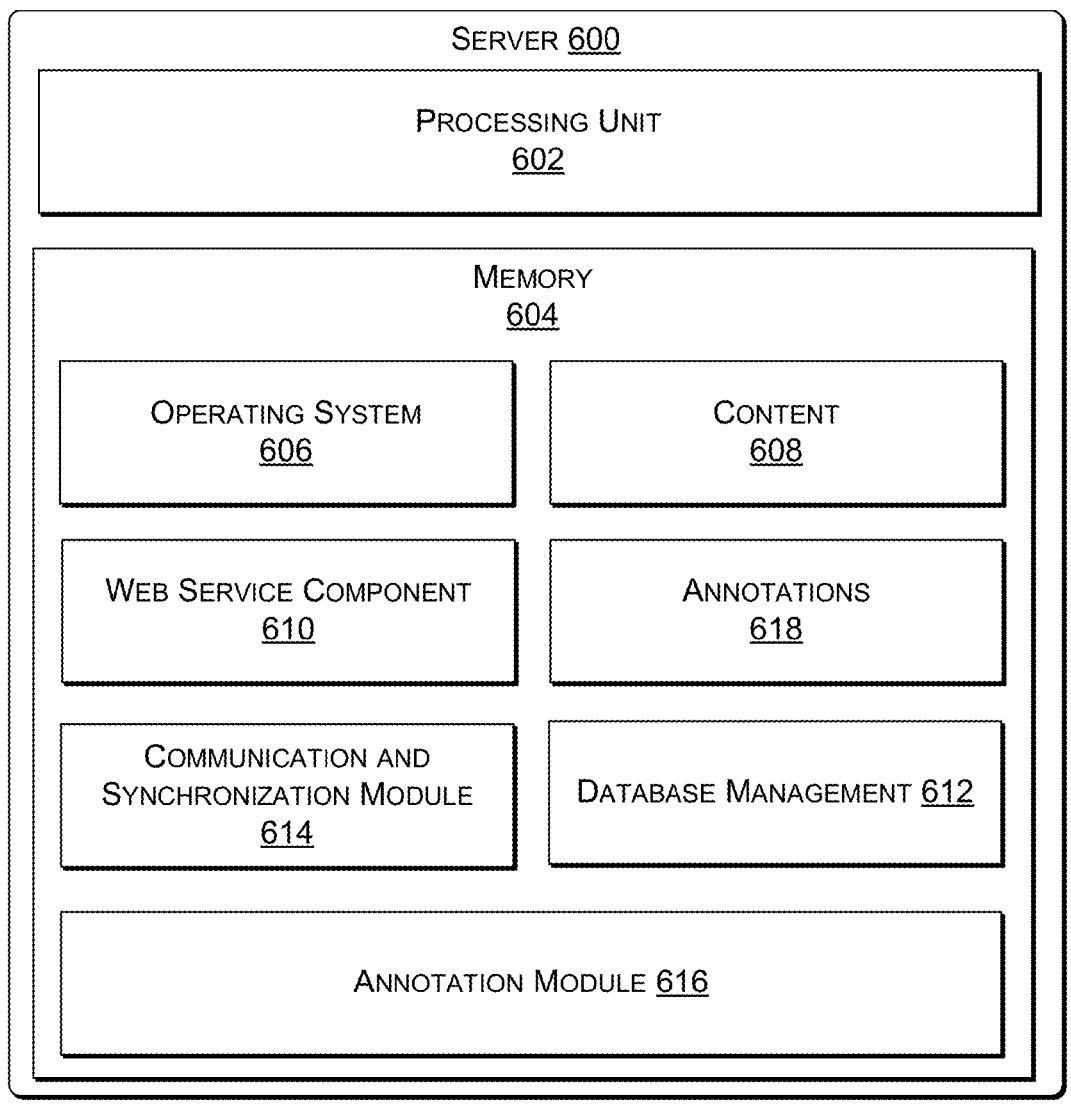
FIG. 6 is a block diagram illustrating selected modules of a server that may be used to implement annotation service functionality described herein.

FIG. 6 illustrates relevant components of a server 600 that may be used to implement the functionality of the content service 102. Generally, the content service 102 may be implemented by one or more servers, with the various functionality described above distributed in various ways across the different servers. Servers may be located together or separately, and organized as virtual servers, server banks, and/or server farms. The described functionality may be provided by the servers of a single entity or enterprise, or may utilize the servers and/or services of multiple entities or enterprises. For purposes of discussion, the functionality of content service 102 is described as being implemented by the single server 600.

In a very basic configuration, the example server 600 might comprise a processing unit 602 composed one of one or more processors, and memory 604. The memory 604 may comprise computer storage media and may include volatile and nonvolatile memory. Thus, the memory 604 may include, but is not limited to, RAM, ROM, EEPROM, flash memory, or other memory technology, or any other medium which can be used to store media items or applications and data which can be accessed by the server 600.

The memory 604 may be used to store any number of functional components that are executable on the processing unit 602, as well as data and content items that are supplied to consuming devices such as the eBook reader device 110. Thus, the memory 604 may store an operating system 606 and a content storage database 608 to store one or more content items such as eBooks.

Functional components of the server 600 may also comprise a web service component 610 that interacts with remote devices such as computers and content consumption devices. The client interface 106 may be implemented by the web service component 610, for example.

The server 600 may also include various database management components 612 for keeping track of users, purchases, etc. The server 600 may also include a communication and synchronization module 614 to communicate with remote consumption devices, to communicate any purchased electronic content to those devices, and to receive annotations from content consumption devices.

The server 600 may include an annotation module 616 that is configured as operating logic to perform the processes described above with reference to blocks 126, 128, 130, and 132 of FIG. 1, and to implement other server annotation functionality described herein, such as described with reference to FIG. 7, below.

The server 600 may of course include many other logical, programmatic, and physical components, of which those shown in FIG. 6 are merely examples that are related to the discussion herein.

Example Method

Figure 7:
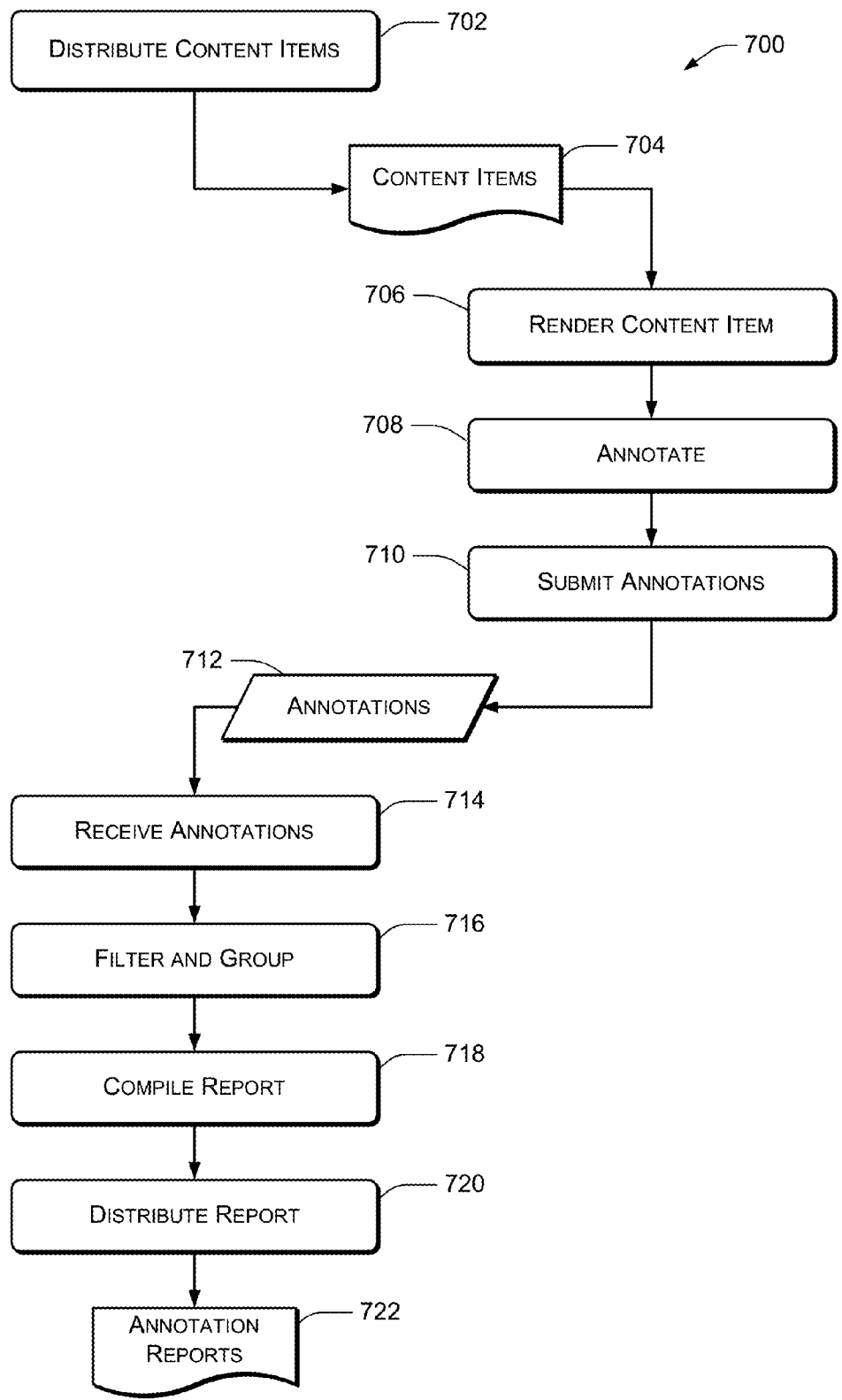
FIG. 7 is flow diagram of an illustrative process of in accordance with the techniques described herein.

FIG. 7 is a flowchart illustrating an example method 700 in accordance with the techniques described above. The method 700 is described as being implemented in conjunction with the content consumption device 100 and a server 600 such as shown in FIGS. 2 and 3, respectively. However, it should be understood that the method 700 may be implemented using other suitable devices and architectures. Actions performed by the server 600 are shown on the left side of FIG. 7, while actions performed by the content consumption device 100 are shown on the right.

The method 700 begins at 702, at which one or more content items 704, such as eBooks, are distributed to one or more content consumption devices 110, for eventual rendering on the content consumption devices 110. The content items 704 may be distributed from the content service 102 and may be stored in memory 504 of the content consumption devices 110. Although wireless or network-based distribution is used in many embodiments, other forms of distribution might also be used, such as distribution on physical media.

As described above, individual content items are associated respectively with various content creators, including authors, translators, publishers, editors, and so forth.

Distribution 702 may be part of a normal release of a digital work such as an eBook, where consumers purchase the eBook for consumption and provide annotative feedback at will. In this case, consumers may use the annotation features described herein as an optional enhancement to their reading experience. In other cases, distribution 702 might constitute a special or limited release, for the explicit purpose of obtaining feedback and corrections from specifically targeted users or reviewers.

Thus, distribution of individual content items may be unrestricted or may be restricted to certain groups, types, or classes of people. For example, distribution might sometimes be limited to users who are selected for their skills or expertise relative to content review. Different classes of users and reviewers to whom distribution can be limited might include:
  previous reviewers;
  highly-rated or highly-trusted reviewers;
  paid reviewers;
  subject-area/genre specialists;
  members of a group, club, or organization, such as a book club;
  professional reviewers;
  individually selected users; and
  randomly selected users.

At 706, a particular content item is rendered on the content consumption device 110 for consumption by the user 112. Navigation with the content item is facilitated by the reading and navigation module 512 (FIG. 5) of the content consumption device 110.

At 708 the user annotates the rendered content and the annotation module 514 of the content consumption device 110 captures and stores the annotations. Each annotation references a particular part of or location within the rendered content. In some embodiments, annotations may be designated by the user as either public or private, and/or as anonymous or not anonymous.

At 710, the communication and synchronization module 518 of the content consumption device 110 transmits the annotations, referenced in FIG. 7 by reference numeral 712, to the annotation service 124, via the client interface 106 of the content service 102. The transmitting may be performed automatically, without further initiation by the user, in response to accepting annotations from the user. Alternatively, the transmitting may be performed upon specific request by a user, or after summarizing the annotations to the user and prompting the user for permission to perform the transmitting.

At 714, the annotation service 124, implemented by one or more servers such as server 600, receives the annotations 712 and stores them. The annotations 712 are associated respectively with particular parts of individual content items. More specifically, each annotation may reference or be associated with a particular content item and a particular location within that content item. Annotations 712 may be recorded as anonymous and/or as private, in accordance with designations by the users who submitted the annotations.

At 716, the annotation module 616 optionally filters and groups the annotations. Filtering may include omitting duplicate or similar annotations, or omitting annotations from users having relatively lower reputational scores. Filtering may also be performed based on preferences indicated by a creator 122 to whom the annotations will be presented. For example, a particular content creator might specify that they only want to see annotations that are direct edits, such as typographical or editorial corrections. A content creator might similarly indicate that they only want to see annotations from a particular user, or from a particular class of users or reviewers. User classes might include, for example:
  previous reviewers;
  highly-rated or highly-trusted reviewers;
  paid reviewers;
  subject-area/genre specialists;
  members of a group, club, or organization, such as a book club;
  professional reviewers;
  individually selected users; and
  randomly selected users.

Filtering may also be performed based on other factors, such as annotation type, annotation length, annotation date, and so forth. Also, filtering may be customized depending on the role of the content creator who will receive the annotations. For example, an author may want to see only certain types of annotations, from certain classes of users, while an editor may want to see other annotations.

Grouping the annotations may likewise be performed in various ways, such as by date, by user, by annotation type, by location, and so forth. In some embodiments, annotations may be grouped according to the portions or parts of the content item to which they apply. Annotations may also be grouped by contributor, or by user classes as enumerated above.

Annotations may also be grouped by similarity. For example, annotations such as comments and suggestions might be analyzed semantically and/or according to their word content to determine similarity. Annotations might be analyzed by human technicians or by some automated or partially automated process to determine similarity. Furthermore, techniques might be used when receiving comments from users to encourage verbatim adoption of previously entered comments when appropriate. For example, a user might be given the option of adopting a comment that was previously entered by another user. Comments chosen in this manner would be judged to have a high degree of similarity.

At 718, the annotation module 616 compiles the annotations associated with the parts of a particular content item, and prepares or formats a report for one or more of the content creators 122. An example of such a report is shown in FIG. 4, in which the displayed annotations reference respectively associated parts of an eBook. However, annotation reports may be presented in many different formats and might include many different types of information.

At 720, the compiled annotations are reported by distributing annotation reports 722 to at least one of the content creators 122. Reports may be distributed in many different ways, such as by website or email.

The reporting 720 may be performed periodically, to produce reports of annotations made during different time periods. The annotation reports 722 may be provided to the content creators 122 without specific request, such as by email, or in response to specific activity or requests by the content creators, such as in the case where a content creator visits a website through which annotation reports are displayed.

CONCLUSION

Note that the various techniques described above are assumed in the given examples to be implemented in the general context of computer-executable instructions or software, such as program modules, executed by one or more computers or other devices. Generally, program modules include routines, programs, objects, components, data structures, etc., and define operating logic for performing particular tasks or implement particular abstract data types.

Other architectures may be used to implement the described functionality, and are intended to be within the scope of this disclosure. Furthermore, although specific distributions of responsibilities are defined above for purposes of discussion, the various functions and responsibilities might be distributed and divided in different ways, depending on particular circumstances.

Similarly, software may be stored and distributed in various ways and using different means, and the particular software storage and execution configurations described above may be varied in many different ways. Thus, software implementing the techniques described above may be distributed on various types of computer-readable media, not limited to the forms of memory that are specifically described.

Furthermore, although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A computer-implemented method comprising:
   under control of one or more processors configured with executable instructions,
   electronically distributing content items for consumption by human readers, each content item having one or more content creators;
   receiving, at a server, a plurality of annotations made by the human readers, the annotations being associated respectively with particular parts of individual content items;
   grouping the annotations based at least in part on similarity of content;
   reporting the grouped annotations to at least one of the one or more content creators of the particular content item; and
   filtering the annotations reported to a first one of content creators differently from the annotations reported to a second one of content creators based at least in part on a first role of the first content creator and a second role of the second content creator.

2. The computer-implemented method of claim 1, wherein the annotations comprise one or more of the following:
   editorial revisions;
   typographical corrections;
   translations;
   language translation corrections;
   facts;
   factual corrections;
   thematic suggestions;
   criticisms;
   answers to questions posed by at least one of the content creators;
   supplemental or additional content; or
   storyline votes.

3. The computer-implemented method of claim 1, wherein the one or more content creators comprise at least one of an author, a publisher, an editor, or a translator.

4. The computer-implemented method of claim 1, wherein the reporting is performed periodically to produce reports of annotations made during different time periods.

5. The computer-implemented method of claim 1, further comprising:
   omitting duplicate annotations in the reporting; and
   indicating a number of the duplicate annotations omitted.

6. The computer-implemented method of claim 1, further comprising grouping the annotations according to portions of the particular content item to which they apply.

7. The computer-implemented method of claim 1, wherein the grouping the annotations based at least in part on similarity of content comprises comparing word content of individual ones of the annotations with word content of other ones of the annotations.

8. The computer-implemented method of claim 1, further comprising grouping annotations made by different classes of human readers.

9. The computer-implemented method of claim 1, further comprising recording the annotations as public or private as designated by the human readers making the annotations.

10. The computer-implemented method of claim 1, further comprising recording the annotations as anonymous in accordance with designations by the human readers making the annotations.

11. The computer-implemented method of claim 1, wherein the annotations are viewable as threaded discussions.

12. The computer-implemented method of claim 1, wherein the distributing is to selected classes of reviewers, said classes of reviewers including one or more of the following:
   previous reviewers;
   highly-rated or highly-trusted reviewers;
   paid reviewers;
   subject-area/genre specialists;
   professional reviewers;
   individually-selected reviewers; or
   randomly-selected reviewers.

13. A system comprising:
   one or more servers configured with executable instructions to perform actions comprising:
      receiving annotations made by human readers in electronic books;
      compiling the annotations made in individual electronic books;
      reporting the compiled annotations made in a particular electronic book to a first content creator and a second content creator of the particular electronic book; and
      filtering the compiled annotations reported to the first content creator differently from the compiled annotations reported to the second content creator based at least in part on respective roles of the first content creator and the second content creator.

14. The system of claim 13, wherein the annotations comprise one or more of the following:
   editorial revisions;
   typographical corrections;
   translations;
   language translation corrections;
   facts;
   factual corrections;
   thematic suggestions;
   criticisms;
   answers to questions posed by at least one of the one or more content creators;
   supplemental or additional content; or
   storyline votes.

15. The system of claim 13, wherein the respective roles comprise at least one of: an author, a publisher, an editor, or a translator.

16. The system of claim 13, the actions further comprising grouping the compiled annotations based on similarity by comparing word content of individual ones of the annotations with word content of other ones of the annotations.

17. A system comprising:
   one or more processors;
   one or more non-transitory computer-readable media coupled to the one or more processors; and
   one or more modules maintained on the one or more non-transitory computer-readable media that, when executed by the one or more processors, cause the one or more processors to perform acts comprising:
      sending an electronic book to a plurality of electronic devices associated with a plurality of respective human readers, the electronic book having an author;
      receiving from the plurality of electronic devices, a plurality of annotations made by the respective human readers, the annotations being associated respectively with particular parts of the electronic book;
      determining one or more duplicate annotations in the plurality of annotations; and
      sending at least one of the annotations to the author of the electronic book with the one or more duplicate annotations omitted and an indication of a number of the duplicate annotations omitted.

18. The system as recited in claim 17, the acts further comprising grouping the annotations based on similarity of content, wherein the sending includes sending the grouped annotations.

19. The system as recited in claim 17, wherein the annotations comprise one or more of the following:
   editorial revisions;
   typographical corrections;
   translations;
   language translation corrections;
   facts;
   factual corrections;
   thematic suggestions;
   criticisms;
   answers to questions posed by at least one of the content creators;
   supplemental or additional content; or
   storyline votes.

20. The system as recited in claim 17, wherein the annotations are each associated with location information indicating a location within the electronic book to which the annotation pertains.

* * * * *